(12) United States Patent
Shibata

(10) Patent No.: US 9,216,739 B2
(45) Date of Patent: Dec. 22, 2015

(54) VEHICLE TRAVEL CONTROL APPARATUS

(71) Applicant: Hitachi Automotive Systems, Ltd., Hitachinaka-shi, Ibaraki (JP)

(72) Inventor: Takeo Shibata, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/376,303

(22) PCT Filed: Feb. 8, 2013

(86) PCT No.: PCT/JP2013/052974
§ 371 (c)(1),
(2) Date: Aug. 1, 2014

(87) PCT Pub. No.: WO2013/132949
PCT Pub. Date: Sep. 12, 2013

(65) Prior Publication Data
US 2015/0039156 A1 Feb. 5, 2015

(30) Foreign Application Priority Data

Mar. 7, 2012 (JP) .................. 2012-050850

(51) Int. Cl.
*G06F 17/10* (2006.01)
*G06G 7/78* (2006.01)
(Continued)

(52) U.S. Cl.
CPC *B60W 30/08* (2013.01); *B60T 7/12* (2013.01); *B60T 7/22* (2013.01); *B60W 30/09* (2013.01);
(Continued)

(58) Field of Classification Search
USPC ............... 701/301, 1, 400, 23, 116, 408, 466, 701/519; 348/113, 116, 118, 139, 135; 342/70, 54, 71; 340/435, 903, 436, 340/933, 937; 356/4.01; 367/99
See application file for complete search history.

(56) References Cited

U.S. PATENT DOCUMENTS 4,203,113 A * 5/1980 Baghdady ............... G01S 7/411
342/418
5,754,099 A * 5/1998 Nishimura ................ B60T 7/22
340/435
(Continued)

FOREIGN PATENT DOCUMENTS

JP 11-348598 A 12/1999
JP 2005-182753 A 7/2005
(Continued)

OTHER PUBLICATIONS

International Search Report dated Mar. 19, 2013 with English translation thereof {Two (2) pages}.

*Primary Examiner* — Ronnie Mancho
(74) *Attorney, Agent, or Firm* — Crowell & Moring LLP

(57) ABSTRACT

A vehicle travel control apparatus that can stop a subject vehicle at an optimum position, and at a subsequent restart time, suitably avoid an obstacle without imposing a burden on a driver is provided.

The vehicle travel control apparatus allows a subject vehicle to travel on the basis of a predetermined set speed, controls the travel of the subject vehicle according to a situation around the subject vehicle, calculates a subject vehicle travel side virtual lane on which the subject vehicle can travel on a subject vehicle travel side, an oncoming vehicle travel side virtual lane on which the subject vehicle can travel on an oncoming vehicle travel side, and a residual road width of a subject vehicle travel road on the basis of a road width, the subject vehicle travel side virtual lane, and the oncoming vehicle travel side virtual lane, and stops, when a point at which the calculated residual road width is smaller than a given value is present, the travel of the subject vehicle at a position in front of the point.

6 Claims, 16 Drawing Sheets

(51) Int. Cl.
*G08G 1/16* (2006.01)
*B60W 30/08* (2012.01)
*B60W 30/09* (2012.01)
*B60T 7/22* (2006.01)
*B60W 50/00* (2006.01)
*B60W 30/095* (2012.01)
*B60T 7/12* (2006.01)
*B60W 30/14* (2006.01)

(52) U.S. Cl.
CPC ......... *B60W 30/095* (2013.01); *B60W 30/0953* (2013.01); *B60W 30/0956* (2013.01); *B60W 50/0097* (2013.01); *B60W 30/14* (2013.01); *B60W 2550/30* (2013.01); *Y02T 10/84* (2013.01)

(56) References Cited

U.S. PATENT DOCUMENTS

| | | | | |
|---|---|---|---|---|
| 5,818,355 A * | 10/1998 | Shirai | ................. | B60K 28/10 180/167 |
| 5,969,969 A * | 10/1999 | Ejiri | ................. | G01C 21/26 701/300 |
| 6,057,754 A * | 5/2000 | Kinoshita | ................. | B62D 1/28 340/435 |
| 6,122,597 A * | 9/2000 | Saneyoshi | ................. | G06T 7/0081 348/E13.014 |
| 6,268,803 B1 * | 7/2001 | Gunderson | ................. | B60Q 9/006 180/168 |
| 6,477,260 B1 * | 11/2002 | Shimomura | ................. | G06T 7/0044 340/435 |
| 7,630,806 B2 * | 12/2009 | Breed | ................. | B60R 21/0134 180/273 |
| 2002/0014988 A1 * | 2/2002 | Samukawa | ................. | G01S 13/426 342/70 |
| 2003/0210807 A1 * | 11/2003 | Sato | ................. | G06T 7/2006 382/104 |
| 2004/0085197 A1 * | 5/2004 | Watanabe | ................. | B60T 7/22 340/435 |
| 2005/0125121 A1 | 6/2005 | Isaji et al. | | |
| 2005/0154505 A1 * | 7/2005 | Nakamura | ................. | G01C 21/365 701/1 |
| 2011/0248880 A1 * | 10/2011 | Miyahara | ................. | G01S 7/4802 342/54 |
| 2013/0194086 A1 * | 8/2013 | Igarashi | ................. | G06K 9/00798 340/435 |
| 2013/0218369 A1 * | 8/2013 | Yoshihama | ................. | B60W 30/08 701/1 |
| 2013/0261950 A1 * | 10/2013 | Sasabuchi | ................. | B61L 23/041 701/301 |
| 2014/0019005 A1 * | 1/2014 | Lee | ................. | G08G 1/166 701/36 |

FOREIGN PATENT DOCUMENTS

JP 2006-273000 A 10/2006
JP 2008-62894 A 3/2008

* cited by examiner

VEHICLE TRAVEL CONTROL APPARATUS

TECHNICAL FIELD

The present invention relates to a vehicle travel control apparatus, and more particularly to a travel control apparatus that changes a vehicle travel characteristic according to an environment around a subject vehicle.

BACKGROUND ART

Up to now, the travel control apparatus has been developed to realize a vehicle control adapted to a road condition. For example, the travel control apparatus has been proposed which changes a target acceleration/deceleration according to a distance to an obstacle in front of the subject vehicle, and improves drivability and safety of a vehicle (for example, refer to PTL 1).

However, when a characteristic of the travel control for the vehicle is changed according to only the distance to the obstacle, the change may not meet an actual road condition and a driver's feeling. For example, in the situation where the obstacle is present on a subject lane, but a remaining road width is sufficiently large, or in a situation where the obstacle is present in front of the subject lane, but present on an opposite lane, but not on the subject lane, it is conceivable that a driver passes through the obstacle at an unchanged vehicle speed without conducting a speed reducing operation. However, the conventional art has a potential to change the vehicle characteristic even in such situations, and provide the driver with a feeling of strangeness.

In view of the above circumstance, for example, a travel control apparatus has been proposed which controls the travel characteristic of the vehicle according to the situation around the subject vehicle (for example, PTL 2). Specifically, the travel control apparatus includes an obstacle detection unit that searches a given area in front of the subject vehicle, and detects an obstacle in front of the subject vehicle, a residual road width calculation unit that calculate a residual road width at a position where the detected obstacle is present, and a vehicle characteristic change unit that changes the vehicle travel characteristic on the basis of the calculated residual road width.

CITATION LIST

Patent Literature

PTL 1: JP-A-2008-62894
PTL 2: JP-A-11-348598

SUMMARY OF INVENTION

Technical Problem

In the technique of the above-mentioned PTL 2, because an ACC is used, if a leading vehicle, a person, or an obstacle is not present on the subject lane, a control is made to maintain a set vehicle speed. However, in the situation where an obstacle is present on a subject vehicle travel road, and an opposite lane travels, it is conceivable that a driver stops the subject vehicle at a distance where the driver can avoid the obstacle, and allows an oncoming vehicle to pass. In this example, when the subject vehicle is decelerated by driver's brake operation, the ACC control is canceled. Therefore, when the ACC control is conducted after deceleration, the set vehicle speed needs to be again set, thereby imposing a burden on the driver. Also, if the subject vehicle stops just in front of the obstacle due to the driver's deceleration operation, it may be difficult to avoid the obstacle at the time of starting the subject vehicle after stoppage.

The present invention has been made in view of the above circumstances, and aims at providing a vehicle travel control apparatus that can stop a subject vehicle at an optimum position, and thereafter suitably avoid an obstacle without imposing a burden on a driver at the time of again starting the subject vehicle, when the subject vehicle travels under a situation in which a road width is narrowed due to existence of the obstacle and an oncoming vehicle.

Solution to Problem

In view of the above problem, the vehicle travel control apparatus according to the present invention allows a subject vehicle to travel on the basis of a predetermined set speed, controls the travel of the subject vehicle according to a situation around the subject vehicle, calculates a subject vehicle travel side virtual lane on which the subject vehicle can travel on a subject vehicle travel side on the basis of a road width, a position and a width of an obstacle, and a subject vehicle speed, calculates an oncoming vehicle travel side virtual lane on which the subject vehicle can travel on an oncoming vehicle travel side on the basis of the road width, the position and the width of the obstacle, the subject vehicle speed, and a position, a width, and a speed of the oncoming vehicle, calculates a residual road width of the subject vehicle travel road on the basis of the road width, the subject vehicle travel side virtual lane, and the oncoming vehicle travel side virtual lane, and stops, when a point at which the calculated residual road width is smaller than a given value is present, the travel of the subject vehicle short of the point.

Advantageous Effects of Invention

According to the present invention, when the subject vehicle travels under the situation in which the road width is narrowed due to existence of the obstacle and the oncoming vehicle, the subject vehicle stops at an optimum position, and at a subsequent restart time, the obstacle can be suitably avoided without imposing a burden on the driver.

DESCRIPTION OF EMBODIMENTS

Figure 1:
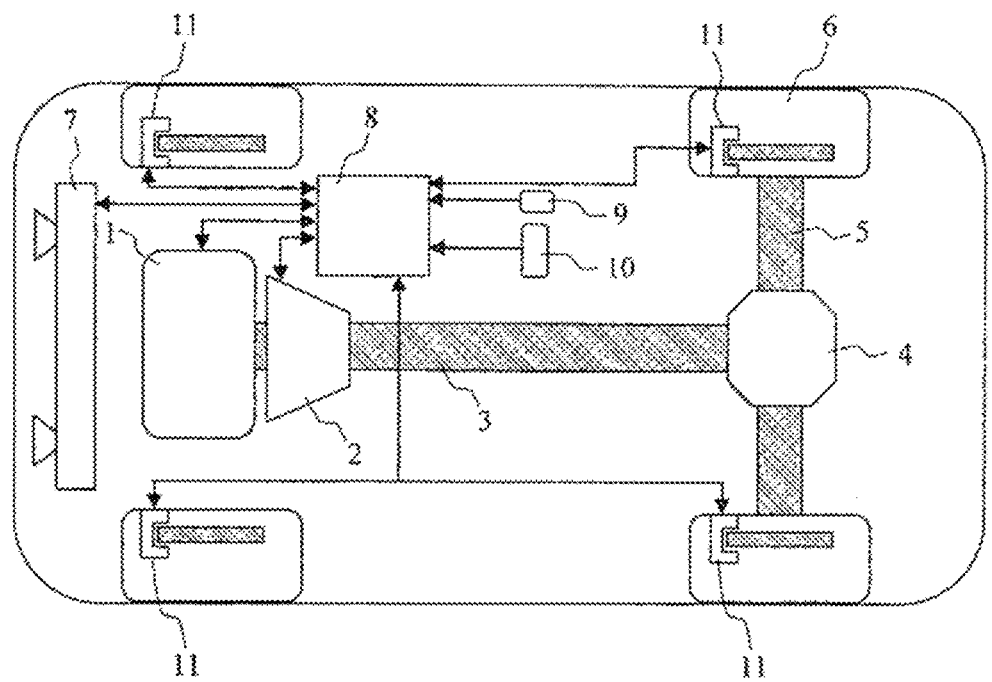
FIG. 1 is a diagram illustrating an outline configuration of a vehicle having a travel control apparatus according to an embodiment of the present invention.

This embodiment will be described with reference to the drawings.

A diagram illustrates an outline configuration of a vehicle (subject vehicle) having a travel control apparatus for a vehicle according to an embodiment of the present invention. The vehicle is configured by a rear drive vehicle with a general configuration including an engine 1 as a power source, an automatic transmission 2 as a drive system, a propeller shaft 3, a differential gear 4, and a drive shaft 5. The vehicle drives wheels 6 which are drive wheels by the engine 1. The vehicle illustrated in this figure exemplifies a vehicle applicable to the embodiment of the present invention, and does not limit a configuration of a vehicle applicable by the present invention, but may include a motor instead of the engine as the power source, or both of the engine and the motor.

A stereo camera 7 is secured to a front portion of the vehicle, and the stereo camera 7 calculates positions, relative speeds, and widths of a leading vehicle, an obstacle, and an opposite vehicle, which are present in front of the subject vehicle, relative to the subject vehicle, and a road width. In this situation, a laser range finder or a CCD camera may be used instead of the stereo camera 7 to perform range finding.

Also, a control unit 8 including the travel control apparatus controls travel of the vehicle, and allows the engine 1, the automatic transmission 2, and brakes 11 to be controlled on the basis of the amount of operation of an accelerator pedal 9 and a brake pedal 10, and information of the stereo camera. As a result, the travel of the vehicle (subject vehicle) is controlled. A subject vehicle speed can be calculated according to the engine speed and a range of the automatic transmission. In this embodiment, the ACC control can be implemented by a generally known method so that the subject vehicle speed becomes a predetermined speed.

Subsequently, the control content of the vehicle control apparatus will be described.

Figure 2:
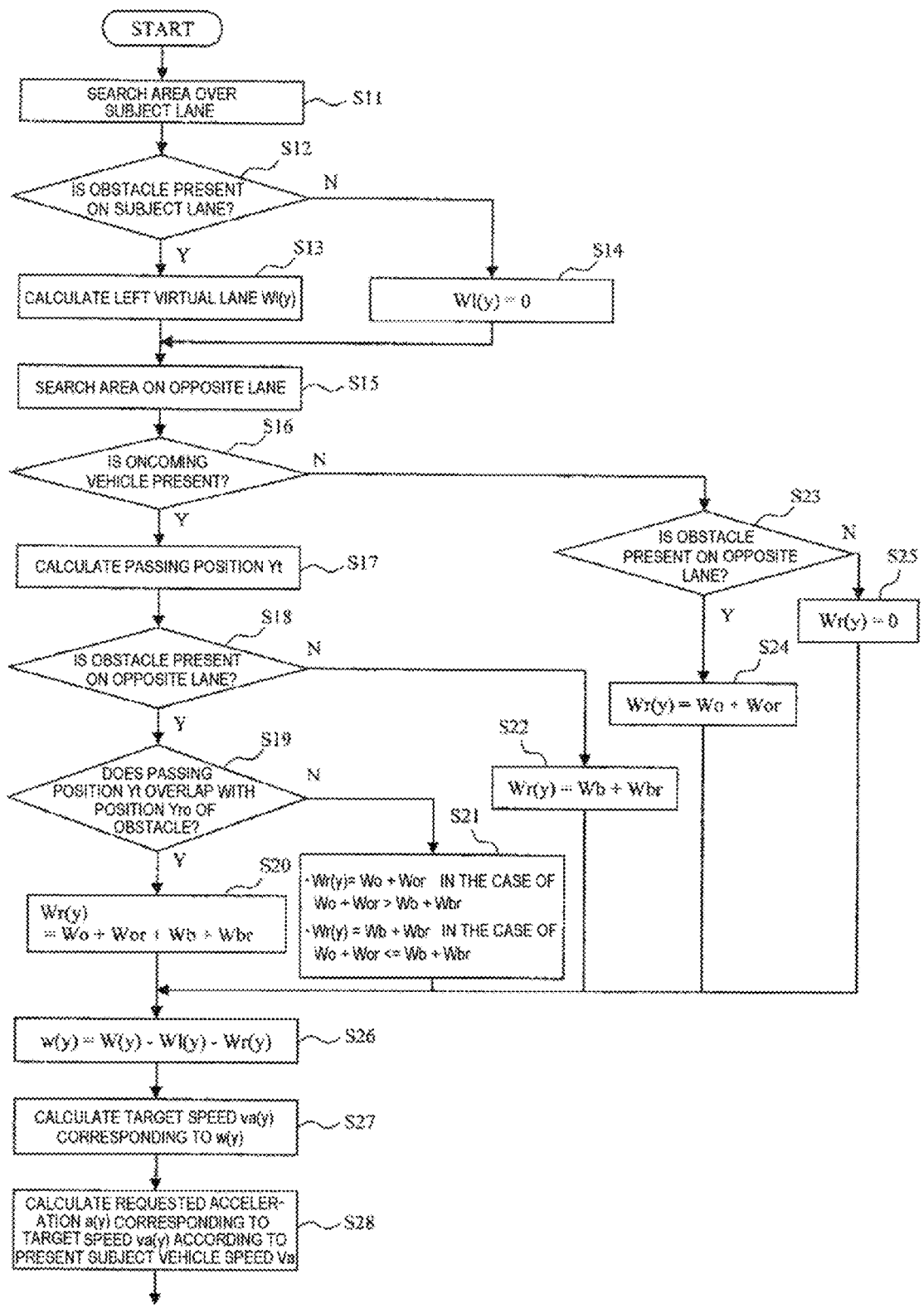
FIG. 2 is a flowchart illustrating processing of a travel control conducted in a control unit illustrated in FIG. 1.

FIG. 2 is a flowchart illustrating processing conducted in a control unit illustrated in FIG. 1. The flowchart shows the operation of the control unit 8, and is repetitively executed every predetermined time interval.

First, in Step S11, a given area in front of the subject vehicle is searched by the stereo camera 7 to detect a road width of a subject vehicle travel road in front of the subject vehicle, which corresponds to a left side from a center of the road (road width detection unit). Specifically, the given area on the left side from the center of the road is searched to detect the road width of the subject vehicle travel road.

As a result of searching an area over a subject lane, the flow proceeds to Step S12, to detect an obstacle on the subject vehicle travel road (obstacle detection unit). If it is determined in Step S12 that the obstacle is present on the subject lane, the flow proceeds to Step S13.

Figure 5:
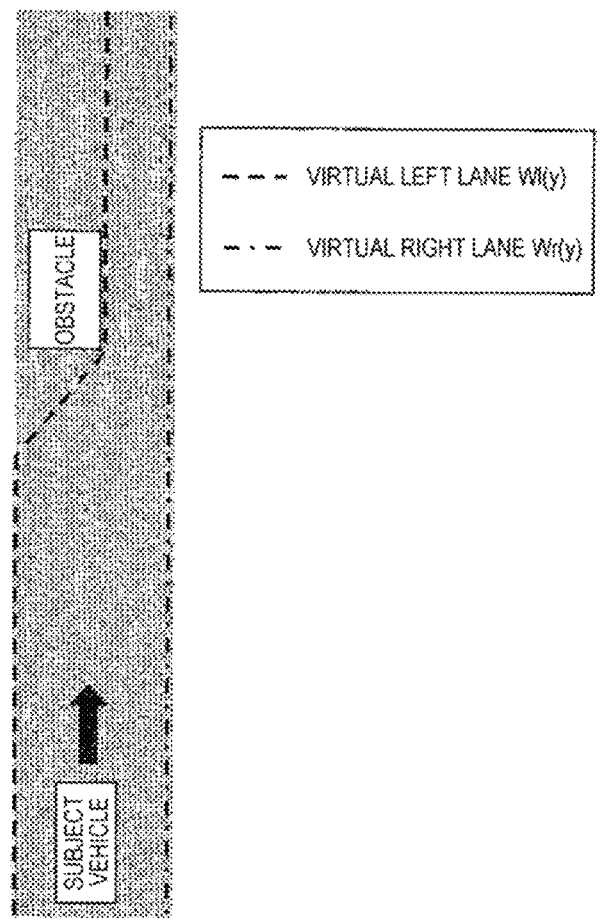
FIG. 5 is a schematic view illustrating calculation of a virtual left side lane and a virtual right side lane when an obstacle is present.
Figure 6:
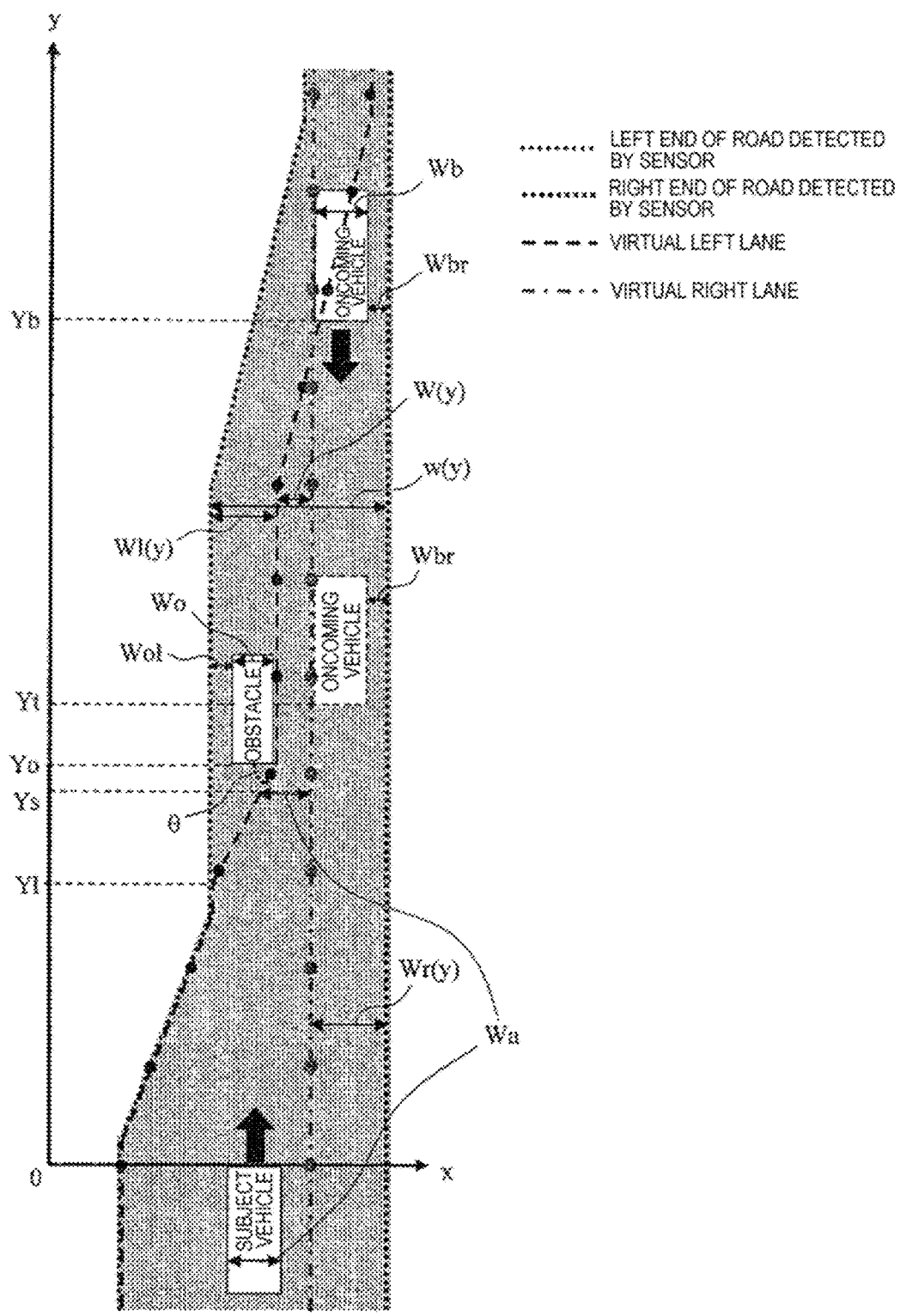
FIG. 6 is a schematic view illustrating the calculation of the virtual left side lane and the virtual right side lane in FIG. 5.

In Step S13, a virtual left side lane Wl(y) in which the subject vehicle can travel on the subject vehicle travel side (left side), that is, a subject vehicle travel side virtual lane is calculated (subject vehicle travel side virtual lane calculation unit). Specifically, as illustrated in FIGS. 5 and 6, the virtual left side lane Wl(y) is calculated (computed) on the basis of the road width, the position and the width of the obstacle, and the subject vehicle speed. The virtual lines, that is, the virtual lanes represent a right end line and a left end line of the area in which the subject vehicle can travel, which is calculated on the basis of the road width, the position and the width of the obstacle, the position, the width, and the speed of the oncoming vehicle, and the subject vehicle speed. In this example, the virtual left side lane Wl(y) which is a left virtual line is calculated.

Now, a method for calculating the virtual left side lane Wl(y) in Step S13 will be described in detail with reference to FIG. 6. In Step S13, a width Wo of the obstacle in a road width direction, a width Wol between the left side lane (road shoulder) and the obstacle based on the position of the obstacle, and a distance Yo from the subject vehicle to the obstacle are detected by the stereo camera 7. Also, an approach angle θ of the virtual left side lane Wl(y) in which the obstacle can be avoided when the subject vehicle travels can be expressed with the use of a relative speed VRo between the subject vehicle and the obstacle Wo through the following relational expression.

$$\theta = \alpha * VRo \ (o < \theta < \pi/2, \alpha = \text{constant})$$

A virtual left side lane start distance Y1 is calculated with the use of the approach angle θ. A method for calculating the virtual left side lane start distance Y1 will be described with reference to FIG. 7. An x-component of the virtual left side lane Wl(y) corresponding to a y-component is calculated according to coordinates of the left side lane in FIG. 7. The x-component of the virtual left side lane Wl is represented by the following expression.

$$x1(y) = Xo - (Yo - y)/\tan\theta$$

Figure 7:
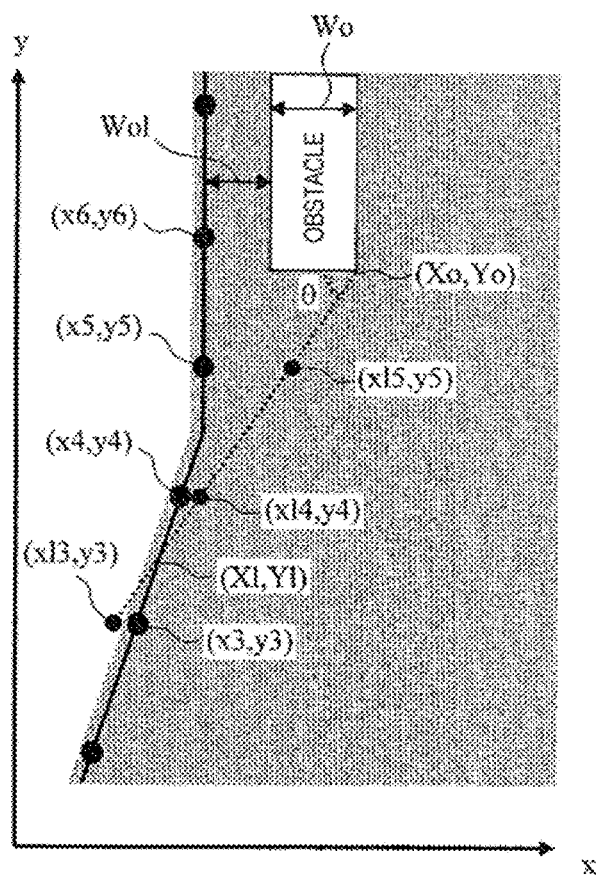
FIG. 7 is a diagram illustrating details of a vicinity of the obstacle in FIG. 6.

Therefore, x13, x14, and x15 in FIG. 7 are calculated as follows.

$$x13 = Xo - (Yo - y3)/\tan\theta$$

$$x14 = Xo - (Yo - y4)/\tan\theta$$

$$x15 = Xo - (Yo - y5)/\tan\theta$$

Referring to FIG. 7, because relationships of x14>x4 and x13<x3 are satisfied, the virtual left side lane start distance Y1 can be calculated through the following expressions.

$$Y1 = (a(Yo - Xo) - y3 \tan\theta)/(1 - \tan\theta)$$

$$a = (y4 - y3)/(x4 - x3)$$

Based on the above, the virtual left side lane Wl(y) in FIG. 6 is calculated by the following expression.

If $0 < y \le Y1, Wl(y) = 0$

If $Y1 < y \le Yo, Wl(y) = (y - Y1)\tan(\pi/2 - \theta)$

If $Yo < y, Wl(y) = Wo1 + Wo$

On the other hand, returning to FIG. 2, if it is determined in Step S12 that the obstacle is not present on the subject lane, the flow proceeds to Step S14.

Figure 8:
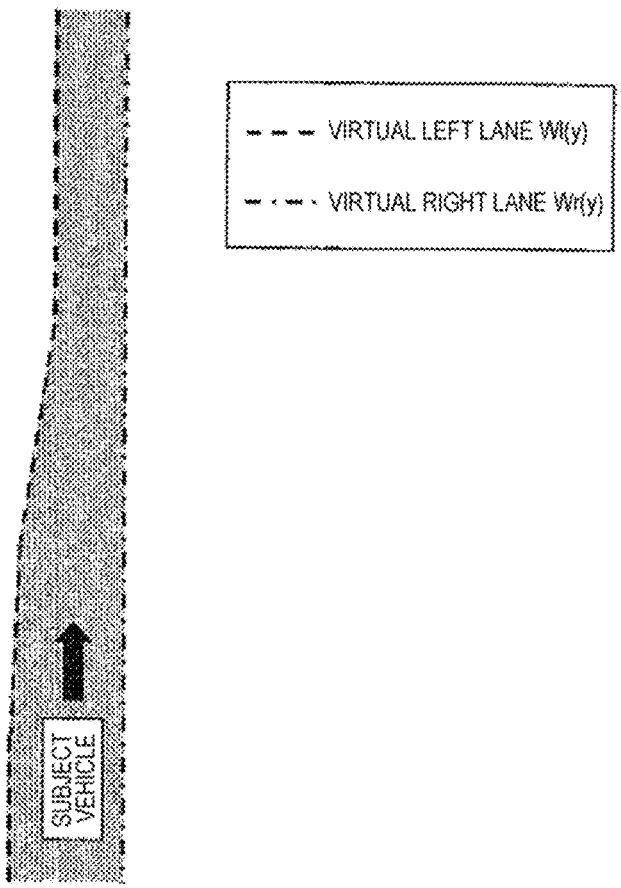
FIG. 8 is a schematic view illustrating a calculation result of the virtual left side lane in FIG. 5.

In Step S14, the virtual left side lane Wl(y) illustrated in FIG. 8 is calculated by the following expression.

$$Wl(y)=0$$

Subsequently, in Step S15, a given area on a right side from a center of the road in front of the subject vehicle is searched by the stereo camera 7 to detect a road width of an oncoming vehicle travel road in front of the subject vehicle, which corresponds to the right side from the center of the road (road width detection unit). Further, the oncoming vehicle on the subject vehicle travel road is detected by the stereo camera 7 (oncoming vehicle detection unit). As a result of searching the area over the opposite lane, if it is determined in Step S16 that the oncoming vehicle is present thereon, the flow proceeds to Step S17.

In Step S17, as illustrated in FIG. 6, an estimated passing position Yt between the subject vehicle and the oncoming vehicle is calculated. The passing position Yt is calculated with the use of a subject vehicle speed Va, a relative speed VRb of the oncoming vehicle, and an inter-vehicle distance Yb of the oncoming vehicle through the following expression.

$$Yt=(Yb*Va)/VRb$$

Subsequently, the flow proceeds to Step S18. In Step S18, the obstacle is detected on the opposite lane according to the result of searching the area over the opposite lane in Step S15. If it is determined that the obstacle is present, the flow proceeds to Step S19.

Figure 9:
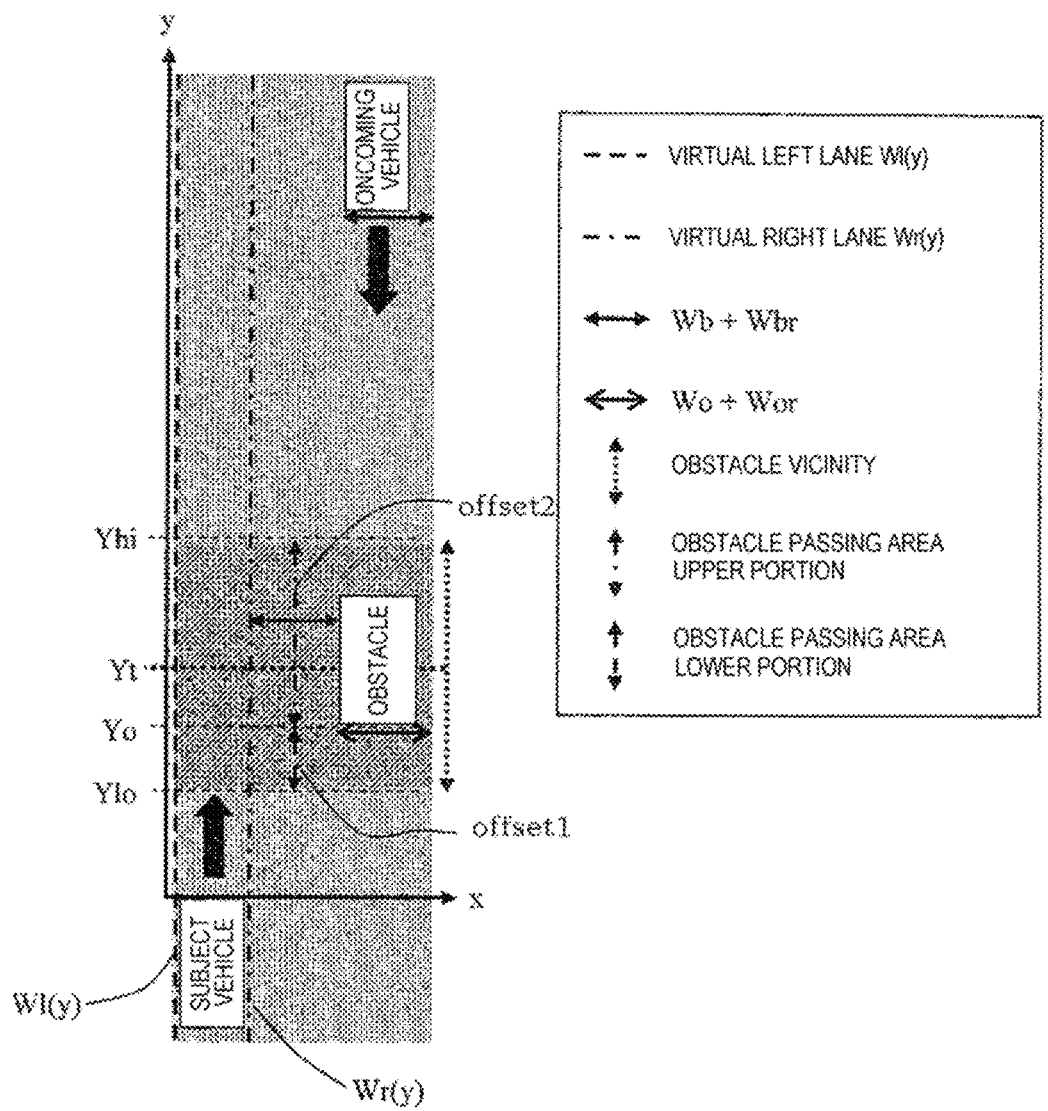
FIG. 9 is a schematic view illustrating the calculation when a passing position calculated in Step S17 of FIG. 2 is in the vicinity of the obstacle.

In Step S19, as illustrated in FIG. 9, if the passing position Yt calculated in Step S17 is located in the vicinity of the obstacle, that is, it is determined that the passing position Yt overlaps with a position Yro of the obstacle. In this example, the vicinity of the obstacle ranges between an obstacle passing lower limit distance Ylo and an obstacle passing upper limit distance Yhi, which are based on the distance Yo of the obstacle. The obstacle passing lower limit distance Ylo and the obstacle passing upper limit distance Yhi are represented with the use of an obstacle passing area lower portion offset1 and an obstacle passing area upper portion offset2 through the following expressions.

$$Ylo=Yo-\text{offset1}$$

$$Yhi=Yo+\text{offset2}$$

The obstacle passing area lower portion offset1 and the obstacle passing area upper portion offset2 may be set to specific fixed values, and may be calculated according to a relational expression of a monotonically increasing function with respect to a relative speed between the subject vehicle and the obstacle, or a relative speed between the subject vehicle and the oncoming vehicle.

If it is determined in Step S19 that the passing position Yt overlaps with the position Yro of the obstacle, the flow proceeds to Step S20. In Step S20, a virtual right side lane Wr(y) illustrated in FIG. 9 is calculated. The oncoming vehicle travel side virtual lane on which the subject vehicle can travel on the oncoming vehicle travel side is calculated on the basis of the position and width of the obstacle, the subject vehicle speed, and the position, the width, and the speed of the oncoming vehicle (oncoming vehicle travel side virtual lane calculation unit).

More specifically, as illustrated in FIG. 9, the virtual right side lane Wr (y) is calculated with the use of an oncoming vehicle width Wb, a width Wbr between the right side lane (road shoulder) of the subject vehicle travel road and the oncoming vehicle, the width Wo of the obstacle, and a width Wor between the right side lane (road shoulder) of the subject vehicle travel road and the obstacle through the following expression. In this example, Wb+Wbr corresponds to the travel road width of the oncoming vehicle in the present invention. That is, since it is estimated that the oncoming vehicle passes through the obstacle while maintaining the width Wbr between the right side lane of the subject vehicle travel road and the oncoming vehicle, the virtual right side lane Wr(y) is calculated as follows.

$$Wr(y)=Wo+Wor+Wb+Wbr$$

On the other hand, if it is determined in Step S19 that the passing position Yt calculated in Step S17 is not located in the vicinity of the obstacle, the flow proceeds to Step S21.

Figure 10:
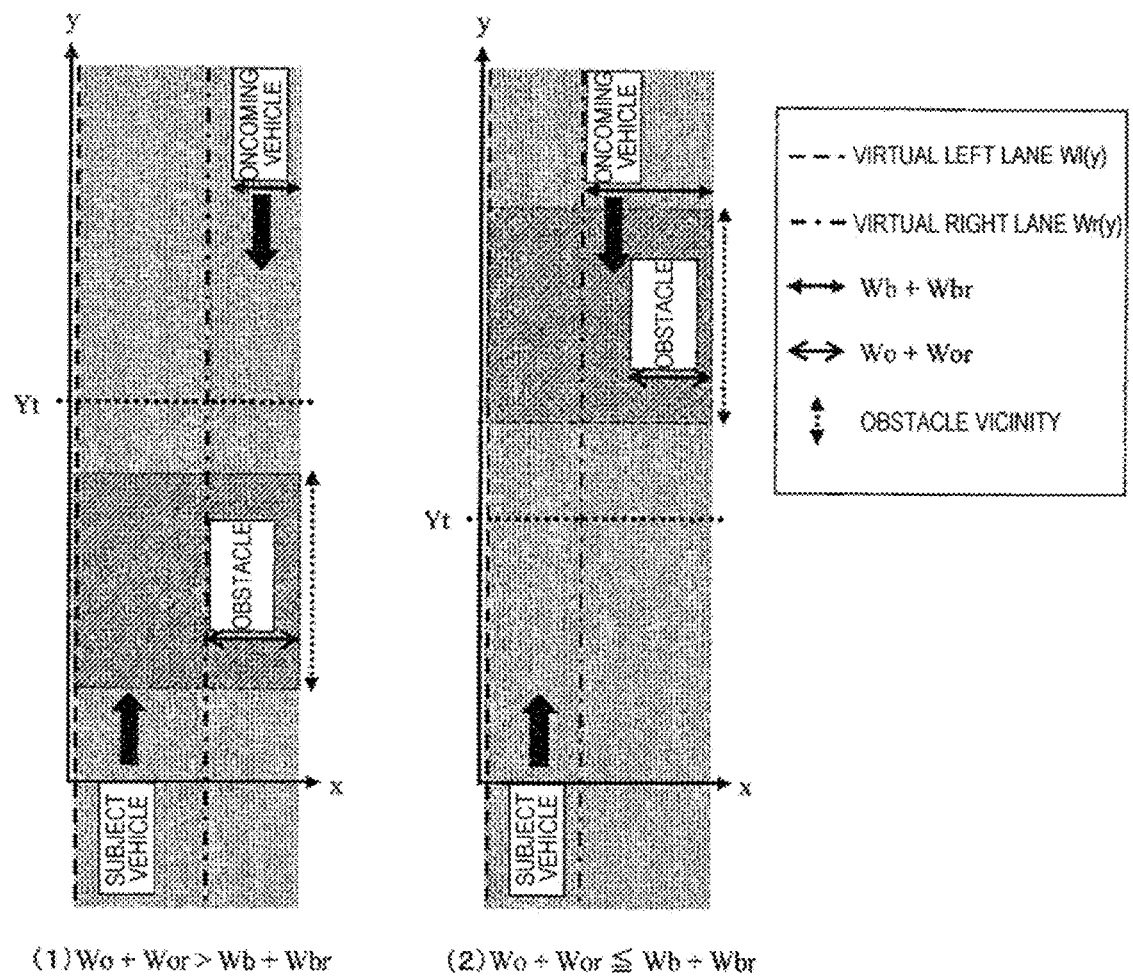
FIG. 10 is a schematic view illustrating a method for calculating the virtual right side lane taking an oncoming vehicle and the obstacle into account in Step S21 of FIG. 2.

In Step S21, the virtual right side lane Wr(y) illustrated in FIG. 10 is calculated through the following expression.

$$\text{If } Wo+Wor>Wb+Wbr, WR(y)=Wo+Wor$$

$$\text{If } Wo+Wor\leq Wb+Wbr, WR(y)=Wb+Wbr$$

On the other hand, if it is determined in Step SS18 that the obstacle is not present on the opposite lane, the flow proceeds to Step S22.

Figure 11:
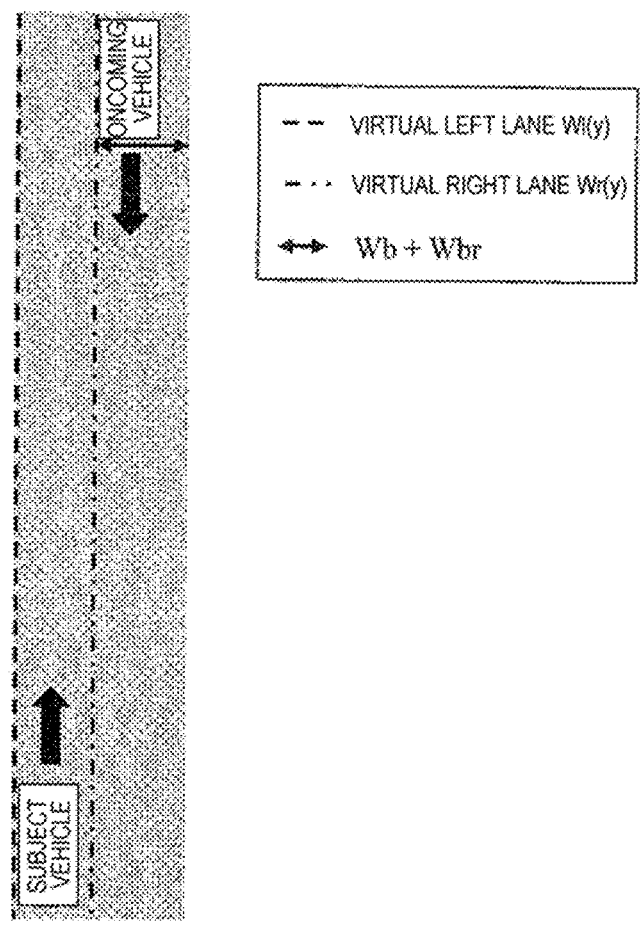
FIG. 11 is a schematic view illustrating a method for calculating the virtual right side lane when no obstacle is present on the opposite lane in Step S22 of FIG. 2.

In Step S22, the virtual right side lane Wr(y) illustrated in FIG. 11 is calculated through the following expression.

$$Wr(y)=Wb+Wbr$$

On the other hand, if it is determined in Step S16 that the oncoming vehicle is not present, the flow proceeds to Step S23.

Further, it is determined in Step S23 whether the obstacle is present on the opposite lane, or not, according to a result of searching an area over the opposite lane in Step S15. If it is determined that the obstacle is present (no oncoming vehicle is present), the flow proceeds to Step S24.

Figure 12:
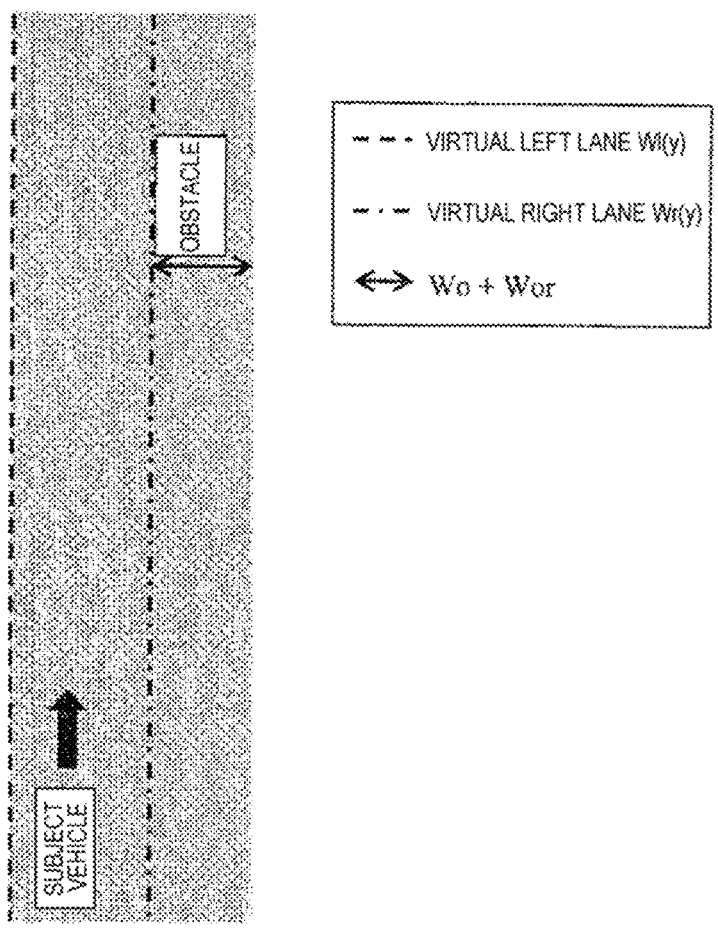
FIG. 12 is a schematic view illustrating a method for calculating the virtual right side lane when no oncoming vehicle is present on the opposite lane in Step S22 of FIG. 2.

In Step S24, the virtual right side lane Wr(y) illustrated in FIG. 12 is calculated through the following expression.

$$Wr(y)=Wo+Wor$$

Figure 13:
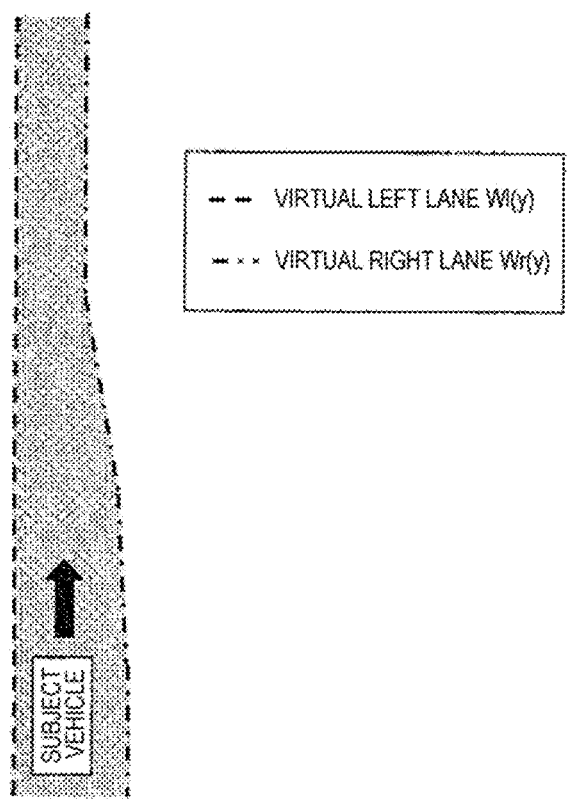
FIG. 13 is a schematic view illustrating a calculation result of the virtual right side lane.
Figure 14:
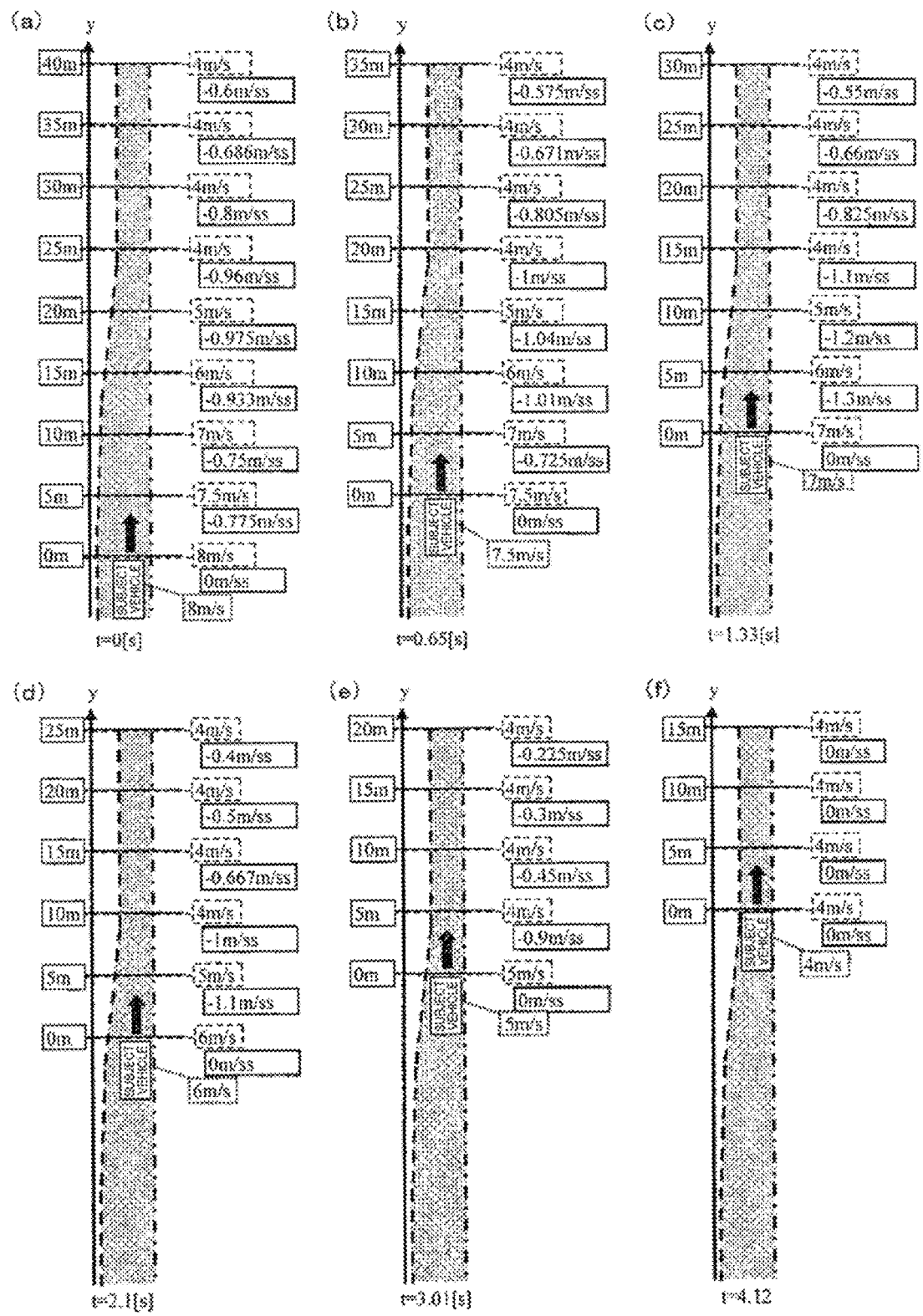
FIGS. 14(a) to 14(f) are schematic views applying a target speed and a requested acceleration calculated in Step S27 and Step S28 with time.

On the other hand, if it is determined in Step S23 that no obstacle is present on the opposite lane, the flow proceeds to Step S25. In Step S25, the virtual right side lane Wr(y) illustrated in FIG. 13 is calculated through the following expression.

$$Wr(y)=0$$

Then, the flow proceeds to Step S26. In Step S26, a virtual subject vehicle passing width (residual road width) w(y) is calculated with the use of a road width W(y) of the subject vehicle travel road in front of the subject vehicle which is detected in Steps S11 and S15, the virtual left side lane Wl(y) calculated in Steps S13 and S14, and the virtual right side lane Wr(y) calculated in Steps S20, S21, S22, S24, and S25 through the following expression. That is, in this example, the residual road width of the subject vehicle travel road is calculated on the basis of the subject vehicle travel side virtual lane and the oncoming vehicle travel side virtual lane (residual road width calculation unit).

$$W(y)=W(y)-Wl(y)-Wr(y)$$

In this way, when the obstacle is present on the opposite lane, and the oncoming vehicle may enter the subject lane, the residual road width is made according to an area of the estimated travel roads of the subject vehicle and the oncoming vehicle. As a result, a vehicle travel state (travel characteristic) of the vehicle can be changed to a passing speed corresponding to the residual road width without canceling the ACC control function, and without providing the driver with a feeling of strangeness.

Then, the flow proceeds to Step S27. In Step S27, a target speed (target passing speed) va(y) of the subject vehicle at a point in front of the subject vehicle is calculated on the basis of the calculated virtual subject vehicle passing width (residual road width) w(y) (target passing speed calculation unit). Specifically, the target speed va(y) corresponding to the virtual subject vehicle passing width w(y) is calculated. It is preferable that a relationship between the virtual subject vehicle passing width w(y) and the target speed va(y) has a monotonically increasing tendency. Therefore, the target speed can be calculated, for example, according to a monotonically increasing function corresponding to the virtual subject vehicle passing width w(y).

In this way, if the obstacle is present on the subject vehicle travel road, but the residual road width is passable, the subject vehicle passes through the obstacle at a speed corresponding to the residual road width without canceling the ACC control function. As a result, a control matching the driver's feeling can be realized.

For example, when the target speed va(y) is calculated according to the virtual subject vehicle passing width w(y), and the target speed va(y) is lower than a predetermined set vehicle speed in the ACC control, the travel of the subject vehicle may be controlled so that the subject vehicle travels at a speed corresponding to the virtual subject vehicle passing width w(y). In this way, preference is given to the speed corresponding to the virtual subject vehicle passing width w(y) over the set vehicle speed with the result that when the virtual vehicle passing width is narrowed, the subject vehicle can travel more safely.

Figure 16:
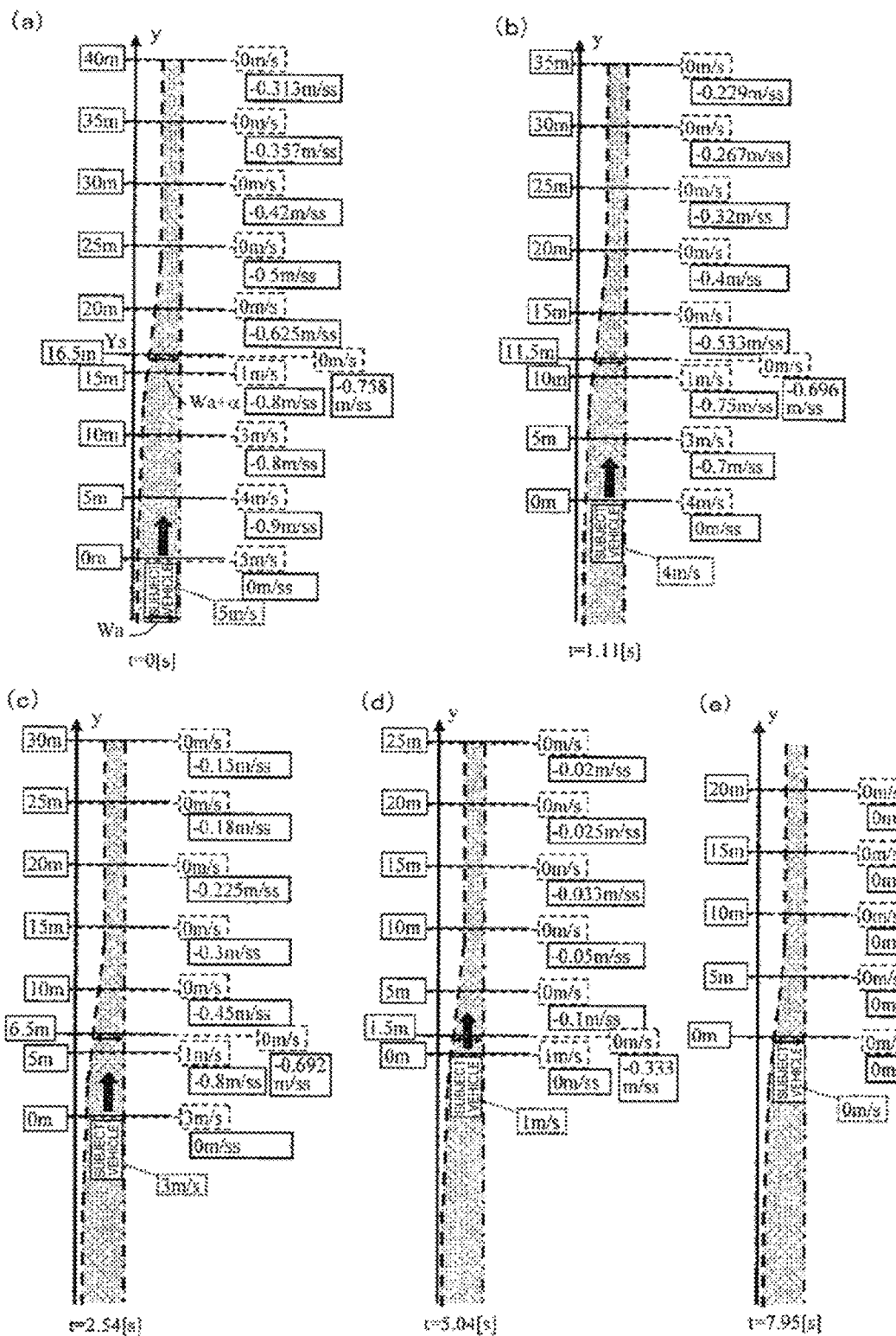
FIGS. 16(a) to 16(e) are schematic views applying a requested acceleration calculated in Step S33 with time.
Figure 17:
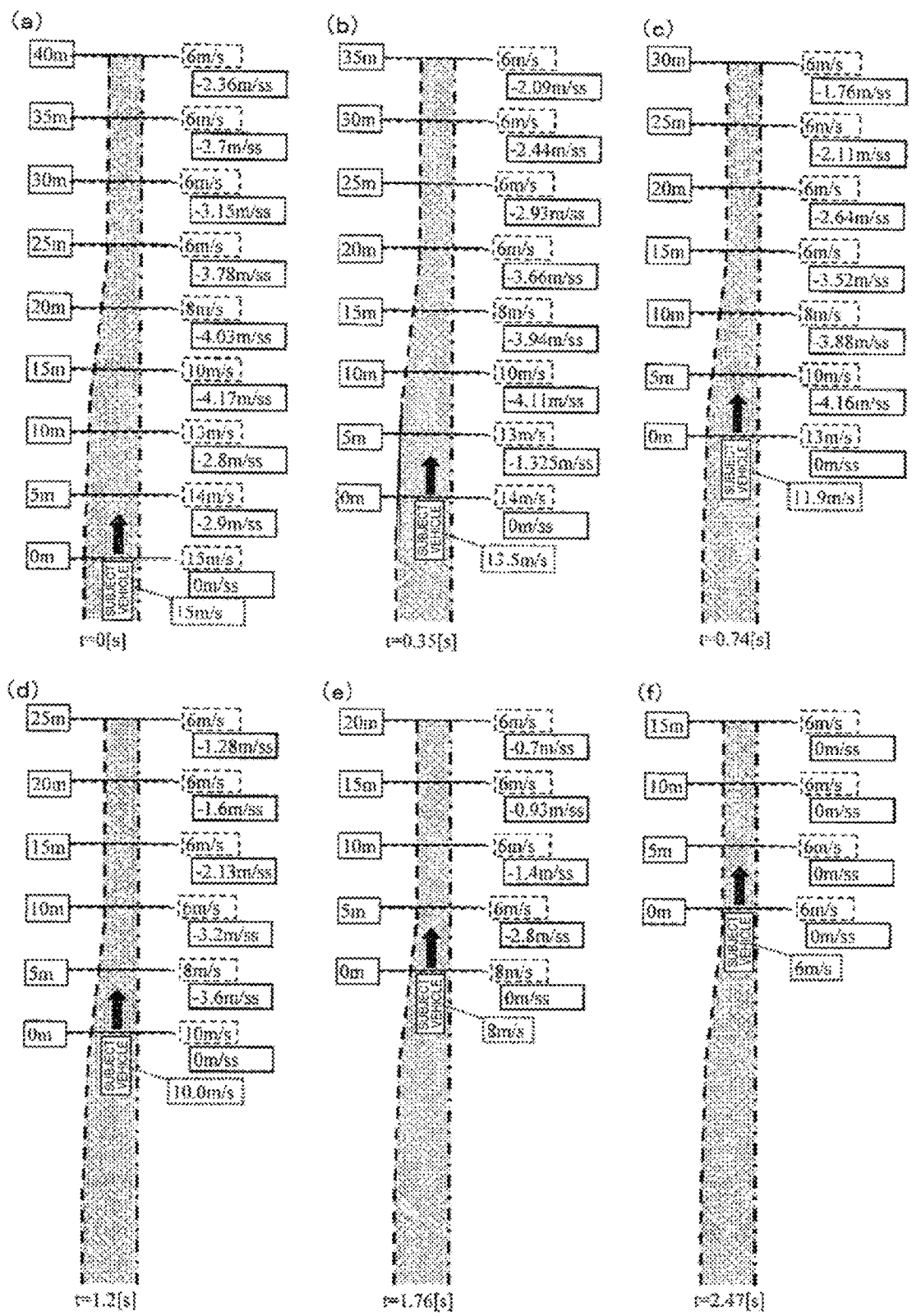
FIGS. 17(a) to 17(f) are schematic views applying a requested acceleration calculated in Step S34 with time.

FIGS. 14(a) to 14(f) illustrate an example of Step S27. As illustrated in FIGS. 14 (a) to 14(f), the target speed va (y) is calculated according to the virtual subject vehicle passing widths w(y) corresponding to respective y-points on a Y-axis. In this case, because the respective y-points on the Y-axis are exemplary, those y-points are expressed at regular intervals of 5 [m] from the present location. Alternatively, the intervals may be changed according to the subject vehicle speed. Also, the intervals are not regular, but may be adjusted to be narrower at a shorter distance, and wider at a longer distance. FIG. 14 and FIGS. 16 and 17 to be described later illustrate distances at the respective points in front of the subject vehicle, and target speeds (target passing speeds) and requested accelerations which are calculated at those points.

Subsequently, the flow proceeds to Step S28. In Step S28, as illustrated in FIG. 14(a), a requested acceleration a(y) is calculated with the use of the present subject vehicle speed Va and the target speed va(y) through the following expression (requested acceleration calculation unit).

$$a(y)=(va(y)^2-Va^2)/2y$$

Then, as will be described later, the engine and the automatic transmission are controlled on the basis of the calculated requested acceleration a(y) to change the vehicle travel state (acceleration and deceleration state) (vehicle travel state change unit).

Figure 3:
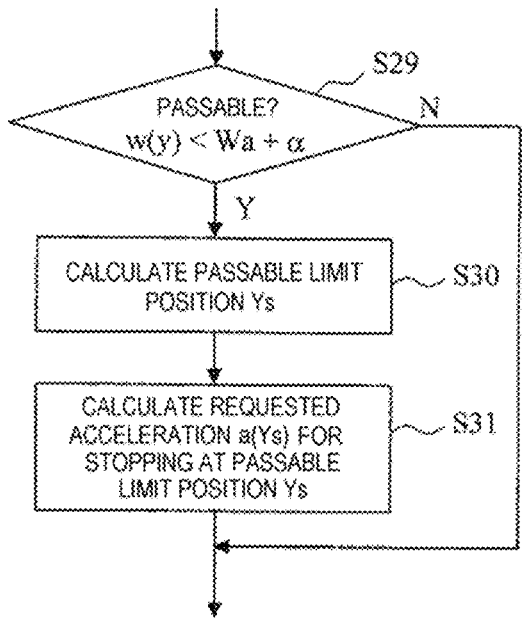
FIG. 3 is a flowchart for calculating a limit position through which a subject vehicle can pass.

When the requested acceleration is calculated in Step 28, and a limit position through which the subject vehicle can pass is present, control further proceeds to the following flow. FIG. 3 is a flowchart for calculating the limit position through which the subject vehicle can pass, which is a flowchart subsequent to Step 28. In Step S29, it is determined whether the virtual subject vehicle passing width w(y) is smaller than a value Wa+α in which a given margin α is added to a subject vehicle width Wa, or not. If the virtual subject vehicle passing width w(y) is smaller than the value Wa+α in which the given margin α is added to the subject vehicle width Wa, it is desirable to stop the travel of the subject vehicle, and the flow proceeds to Step S30.

Figure 15:
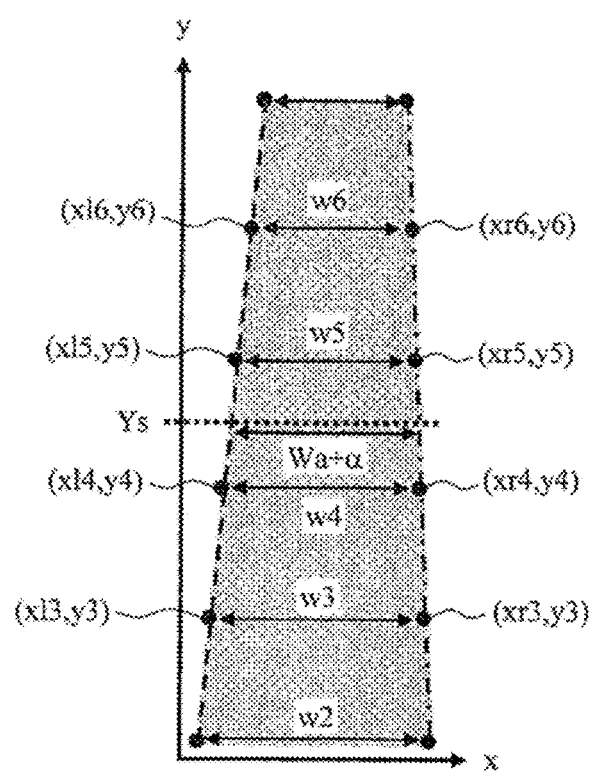
FIG. 15 is a schematic view illustrating a method for calculating a passable limit position.

In Step S30, a passable limit position Ys illustrated in FIG. 15 is calculated. In FIG. 15, the passable limit position Ys satisfies a relationship of w4<(Wa+α)<w5, the passable limit position Ys can be calculated through the following expression.

$$Ys=((y5-y4)/(w5-w4))*(Wa+\alpha)+y4$$

That is, in this example, the passable limit position Ys is a value calculated for stopping the travel of the subject vehicle without canceling the ACC control function, at a position (passable limit position Ys) in front of a point when the point at which the calculated residual road width is smaller than the subject vehicle width Wa is present.

Then, after the passable limit position Ys is calculated in Step S30, the flow proceeds to Step S31. In Step S31, the requested acceleration a(y) is calculated to stop the subject vehicle at the passable limit position Ys illustrated in FIG. 16(a). Then, the flow proceeds to Step S32.

Figure 4:
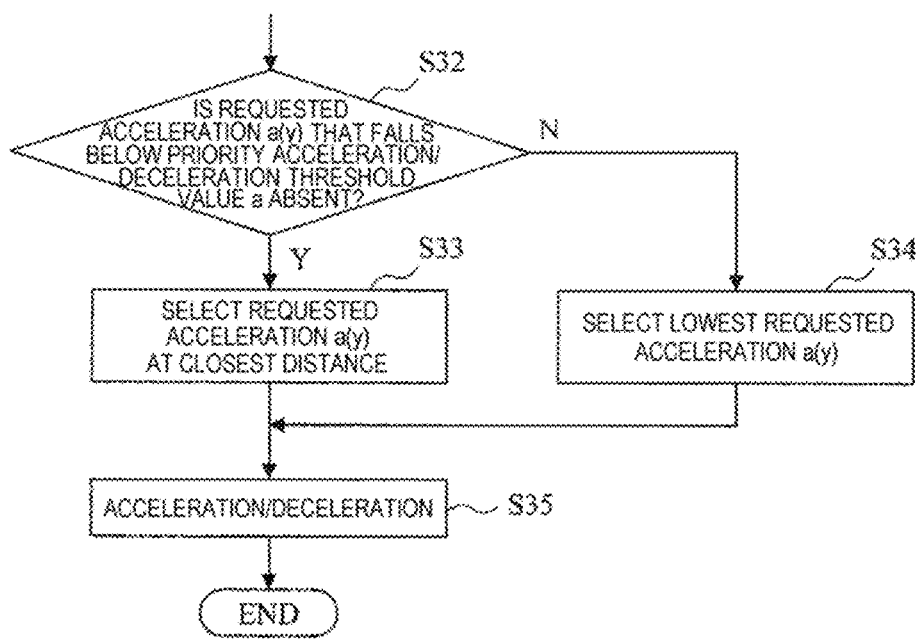
FIG. 4 is a flowchart illustrating a method for changing a travel state of the vehicle at a passable limit position.

FIG. 4 is a flowchart illustrating a method for changing the travel state of the vehicle at the passable limit position, which is a flowchart subsequent to Step 31. When the point at which the calculated residual road width is smaller than the subject vehicle width Wa is present, the travel control is conducted to stop the travel of the subject vehicle without canceling the ACC control function at the position (passable limit position Ys) in front of that point. Specifically, first, in Step S32 and Step 33, if the requested accelerations (specifically, decelerations) calculated at the respective points are larger (decelerations are smaller) than a priority acceleration/deceleration threshold value, the vehicle travel state is changed on the basis of a requested acceleration calculated at a point shortest to the subject vehicle among the requested accelerations calculated at the respective points.

First, in Step S32, if the requested acceleration a(y) that falls below a priority acceleration/deceleration threshold value Alo (for example, −3 [m/ss] (sign of − is deceleration) is absent among the requested accelerations a(y) calculated in Steps S28 and S31, the flow proceeds to Step S33.

In Step S33, the requested acceleration at a closest y-point is selected from the calculated requested accelerations a(y). FIGS. 16(a) to 16(e) illustrate an example of Step S33. FIG. 16(a) illustrates the target speeds va(y) and the requested accelerations a(y) at the respective y-points at a time point of time t=0 [s]. Also, the subject vehicle speed Va is 5 [m/s], and the passable limit position Ys is located at 16.5 [m] in front of the subject vehicle.

In this situation, because the virtual subject vehicle passing width w(y) becomes narrower forward, the target speed va (y) becomes a value lower than 5 [m/s]. Because the requested acceleration a(y) that falls below the priority acceleration/ deceleration threshold value Alo (for example, −3 [m/ss]) is absent among the requested accelerations a(y) calculated on the basis of the target speeds va(y) at the respective y-points and the subject vehicle speed 5 [m/s], a requested acceleration a (5)=−0.9 [m/ss] at the closest y-point y=5 [m] is selected. Therefore, at the time point of t=0 [s], the requested acceleration of −0.9 [m/ss] is output in Step S33.

Subsequently, FIG. 16(b) illustrates the target speeds va(y) and the requested accelerations a(y) at the respective y-points at a time point of the time t=1.11 [s] where deceleration is conducted at the requested acceleration −0.9 [m/ss] of FIG. 16(a).

In this situation, the subject vehicle speed Va matches the subject vehicle speed Va(0)=4 [m/s]. The requested acceleration a(y) that falls below the priority acceleration/deceleration threshold value Alo (for example, −3 [m/ss]) is absent among the requested accelerations a(y) calculated on the basis of the target speeds va(y) at the respective y-points and the subject vehicle speed 4 [m/s]. Therefore, a requested acceleration a (5)=−0.7 [m/ss] at the closest y-point y=5 [m] is selected. Therefore, at the time point of t=1.11 [s], the requested acceleration of −0.7 [m/ss] is output in Step S33. Similarly, the requested acceleration is output in the same method at times indicated in FIGS. 16(c) and 16(d).

FIG. 16(e) illustrates the target speeds va(y) and the requested accelerations a(y) at the respective y-points at a time point of the time t=7.95 [s]. In this situation, the subject vehicle speed Va matches a target speed va(0)=0 [m/s], and stops. With the above operation of FIGS. 16(a) to 16(e), the subject vehicle can pass at the optimum subject vehicle speeds corresponding to the virtual subject vehicle passing widths w(y) at the respective y-points.

On the other hand, in Step S32, if the requested acceleration a(y) that falls below the priority acceleration/deceleration threshold value Alo (for example, −3 [m/ss]) is present, that is, if the requested accelerations calculated at the respective points of the subject vehicle travel road are smaller than a given value (deceleration is larger), the flow proceeds to Step S34.

In Step S34, the requested acceleration having the lowest value is selected from the calculated requested accelerations a(y). FIGS. 17(a) to 17(f) illustrate an example of Step S34. FIG. 17(a) illustrates the target speeds va(y) and the requested accelerations a(y) at the respective y-points at a time point of time t=0 [s]. Also, the subject vehicle speed Va is 15 [m/s]. In this situation, because the virtual subject vehicle passing width w(y) becomes narrower forward, the target speed va (y) is also a value lower than 15 [m/s]. Because the requested acceleration a(y) that falls below the priority acceleration/ deceleration threshold value Alo (for example, −3 [m/ss]) is present among the requested accelerations a(y) calculated according to the target speeds va(y) at the respective y-points, and the subject vehicle speed 15 [m/s] (that is, the requested deceleration speed is larger than −3 [m/ss]), the requested acceleration a(15)=−4.17 [m/ss] of y=15 [m] largest in the requested acceleration value (largest in requested deceleration) is selected. Therefore, in Step S34, the requested acceleration of −4.17 [m/ss] is output at the time point of t=0 [s].

FIG. 17(b) illustrates the target speeds va(y) and the requested accelerations a(y) at the respective y-points at a time point of the time t=0.35 [s] where deceleration is conducted at the requested acceleration −4.17 [m/ss] of FIG. 17(a). In this situation, the subject vehicle speed Va is 13.5 [m/s], and falls below the target speed va(0)=14 [m/s]. Because the requested acceleration a(y) that falls below the priority acceleration/deceleration threshold value Alo (for example, −3 [m/ss]) is present among the requested acceleration a(y) calculated according to the target speeds va(y) at the respective y-points, and the subject vehicle speed 13.5 [m/s], the requested acceleration a(10)=−4.11 [m/ss] of y=10 [m] lowest in the value is selected. Therefore, in Step S33, the requested acceleration of −4.11 [m/ss] is output at the time point of t=0.74 [s]. In FIGS. 17(c) and 17(d), the requested acceleration is output in the same method.

In FIGS. 17(e) and 17(f), because the requested acceleration a(y) that falls below the priority acceleration/deceleration threshold value Alo (for example, −3 [m/ss]) is absent, the flow proceeds to Step S33. With the above operation of FIGS. 17(a) to 17(f), the subject vehicle can pass without rapidly changing the requested acceleration responsive to a rapid change of a distant virtual subject vehicle passing width w(y).

Subsequently, the flow proceeds to Step S35. In Step S35, acceleration or deceleration of the requested acceleration a(y) selected in Step S32 or S34 is implemented without canceling the ACC control function.

As described above, in this embodiment, even if the subject vehicle travels under the situation in which the road width is narrowed due to existence of the obstacle and the oncoming vehicle, the subject vehicle stops at the passable limit position. As a result, at the subsequent restart time, the obstacle can be suitably avoided.

Also, in the conventional art, when deceleration is made by the brake operation of the driver, the ACC is canceled. Therefore, when the ACC is made after deceleration, there is a need to again set the set vehicle speed. On the other hand, according to this embodiment, this operation may not be conducted, and a burden on the driver can be reduced.

The stop of the subject vehicle is controlled according to the virtual subject vehicle passing width (residual road width) of the subject vehicle travel road calculated on the basis of the subject vehicle travel side virtual lane and the oncoming vehicle travel side virtual lane. As a result, a determination of the driver of whether the subject vehicle stops by the deceleration operation, or is allowed to pass while keeping the set vehicle speed is reduced. Also, the subject vehicle can travel without providing the driver with a feeling of strangeness.

Further, when the obstacle is present on the subject lane, and the subject vehicle may enter the opposite lane, the residual road width is estimated from an area of the travel road estimated from the travel states of the subject vehicle and the oncoming vehicle. Therefore, the subject vehicle can avoid the obstacle from the residual road width, and stop at a point where to allow the oncoming vehicle to pass.

The embodiment of the present invention has been described above with reference to the drawings in detail. However, the specific configuration is not limited to this embodiment, but a design change without departing from the spirit of the present invention is included in the present invention.

For example, a method for detecting the obstacle or the oncoming vehicle may employ another method other than the above-mentioned method. Also, not only a change in the acceleration or deceleration may be conducted by changing a transmission gear ratio of the automatic transmission or an assist quantity of the brake, but also the output may be changed by controlling an intake air mass of the engine 1 or a fuel injection quantity, or by changing a brake regeneration amount if the method is applied to a hybrid electric vehicle or an electric vehicle.

REFERENCE SIGN LIST 1, engine
2, automatic transmission
3, propeller shaft
4, differential gear
5, drive shaft
6, wheels
7, stereo camera
8, control unit
9, accelerator pedal
10, brake pedal
11, brake

The invention claimed is:
1. A vehicle travel control apparatus that travels on the basis of a predetermined set speed, and controls a travel of a subject vehicle according to a situation around the subject vehicle, the travel control apparatus comprising:
- a road width detection unit that detects a road width of a subject vehicle travel road in front of the subject vehicle;
- an obstacle detection unit that detects a position of an obstacle on the subject vehicle travel road;
- an oncoming vehicle detection unit that detects a position of an oncoming vehicle on the subject vehicle travel road;
- a width detection unit that detects widths of the detected obstacle and the detected oncoming vehicle in a direction of the road width;
- a subject vehicle travel side virtual lane calculation unit that calculates a subject vehicle travel side virtual lane on which the subject vehicle can travel on the subject vehicle travel side, on the basis of the road width, the position and the width of the obstacle, and the subject vehicle speed;
- an oncoming vehicle travel side virtual lane calculation unit that calculates an oncoming vehicle travel side virtual lane on which the subject vehicle can travel on the oncoming vehicle travel side, on the basis of the road width, the position and the width of the obstacle, the subject vehicle speed, and the position and the width of the oncoming vehicle, and the speed of the oncoming vehicle; and
- a residual road width calculation unit that calculates the residual road width of the subject vehicle travel road on the basis of the road width, the subject vehicle travel side virtual lane, and the oncoming vehicle travel side virtual lane,
- wherein when a point at which the calculated residual road width is smaller than a given value is present, a travel of the subject vehicle stops at a position in front of the point.

2. The travel control apparatus according to claim 1, comprising: a target passing speed calculation unit that calculates a target passing speed of the subject vehicle at each point in front of the subject vehicle on the basis of the calculated residual road width; a requested acceleration calculation unit that calculates a requested acceleration of the subject vehicle on the basis of the target passing speed and the subject vehicle speed; and a vehicle travel state change unit that changes a vehicle travel state on the basis of the requested acceleration.

3. The travel control apparatus according to claim 2,
wherein the target passing speed calculation unit calculates the target passing speed according to the residual road width, and controls the travel of the subject vehicle so that the subject vehicle travels at a speed corresponding to the residual road width when the target passing speed is lower than the predetermined set speed.

4. The travel control apparatus according to claim 1,
wherein when the obstacle detection unit detects the obstacle, and the oncoming vehicle detection unit detects the oncoming vehicle, the travel control apparatus estimates a passing point of the subject vehicle and the oncoming vehicle, and
wherein if the estimated passing point matches a vicinity of the obstacle, the travel control apparatus estimates the travel road width of the oncoming vehicle, and the oncoming vehicle travel side virtual lane calculation unit calculates the oncoming vehicle travel side virtual lane on the basis of the travel road width of the oncoming vehicle.

5. The travel control apparatus according to claim 2,
wherein if the requested acceleration calculated at each point is larger than a given value, the vehicle travel state change unit changes the vehicle travel state on the basis of the requested acceleration calculated at a point closest to the subject vehicle among the requested accelerations calculated at the respective points.

6. The travel control apparatus according to claim 5,
wherein if the requested acceleration calculated at each point of the subject vehicle travel road is smaller than a given value, the vehicle travel state is changed on the basis of the requested acceleration of a lowest value among the calculated requested accelerations.

* * * * *